United States Patent

Jang et al.

[11] Patent Number: 6,136,931
[45] Date of Patent: Oct. 24, 2000

[54] PROCESS FOR PREPARING POLYBUTADIENE USING CATALYST WITH HIGH ACTIVITY

[75] Inventors: Young Chan Jang; Gwang Hoon Kwag; A Ju Kim; Seung Hwon Lee, all of Taejon, Rep. of Korea

[73] Assignee: Korea Kumho Petrochemical Co., Ltd., Seoul

[21] Appl. No.: 09/433,073

[22] Filed: Nov. 3, 1999

[30] Foreign Application Priority Data

Feb. 25, 1999 [KR] Rep. of Korea ............ 99-6298

[51] Int. Cl.$^7$ ............ C08F 4/52; C08F 136/06
[52] U.S. Cl. ............ 526/133; 526/164; 526/340.4
[58] Field of Search ............ 526/133, 164, 526/340.4

[56] References Cited

U.S. PATENT DOCUMENTS

| | | | |
|---|---|---|---|
| 4,699,960 | 10/1987 | Gordini et al. | 526/164 X |
| 4,699,962 | 10/1987 | Hsieh et al. | 526/164 X |
| 4,906,706 | 3/1990 | Hattori . | |
| 5,017,539 | 5/1991 | Jenkins . | |
| 5,064,910 | 11/1991 | Hattori . | |

FOREIGN PATENT DOCUMENTS

| | | |
|---|---|---|
| 0127236A1 | 12/1984 | European Pat. Off. . |
| 0375421A1 | 6/1990 | European Pat. Off. . |
| 0667357A1 | 8/1995 | European Pat. Off. . |

*Primary Examiner*—Fred Teskin
*Attorney, Agent, or Firm*—Birch, Stewart, Kolasch & Birch, LLP

[57] ABSTRACT

This invention relates to a process for preparing polybutadiene with high 1,4-cis content (over 97%) and high conversion (over 90%) in such a manner that 1,3-butadiene is polymerized using an aging catalyst, which has high homogeneity due to its excellent solubility in non-polar solvents, resulting in producing polybutadiene having low gel content and low solution viscosity. The aging catalyst is a mixture of a neodymium compound, an organoaluminum compound and a borontrifluoride complex, which is represented by the formula I or the formula II, in the presence or absence of a small portion of conjugated diene compound:

Formula I is represented by

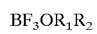

wherein $R_1$ and $R_2$ can be the same or different, and are independent substituents, respectively which are alkyl, cycloalkyl, allyl, aryl or arylalkyl groups containing from 1 to 10 carbon atoms; and Formula II is represented by

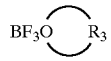

wherein $R_3$ is an alkyl group containing from 2 to 10 carbon atoms.

7 Claims, No Drawings

PROCESS FOR PREPARING POLYBUTADIENE USING CATALYST WITH HIGH ACTIVITY

BACKGROUND OF THE INVENTION

1. Field of the Invention

This invention relates to a process for preparing polybutadiene using a catalyst having high activity in stereoregularity and in conversion, and more particularly, to the process for preparing polybutadiene with high 1,4-cis content over 97% and high conversion over 90% in such a manner that 1,3-butadiene is polymerized using a catalyst prepared by aging a mixture of neodymium compound, organoaluminum compound and borontrifluoride complex in the presence or absence of a small portion of conjugated diene compound.

2. Description of the Prior Art

When polybutadiene is intended to be prepared via polymerization of 1,3-butadiene, the method of using lanthanum series metal catalyst, i.e., the elements from atom number 57 (La) to 71 (Lu), can provide diene polymer containing higher 1,4-cis content than other methods which comprise polymerizing one or more of conjugated diene in the presence of transition metal compound such as nickel (Ni), titanium (Ti) and cobalt (Co).

Among lanthanum series metals, cerium (Ce), lanthanum (La), neodymium (Nd) and gadolinium (Gd) are known to have an excellent catalytic activity; among them, neodymium has the most excellent catalytic activity.

The preparations of high 1,4-cis polybutadiene (hereinafter referred to as "high cis-BR") in the known methods containing a lanthanum series metal catalyst are as follows: The PCT No. 93-05083 has disclosed a process for the preparation of "high cis-BR" using a catalyst prepared by mixing (a) neodymium compound, (b) silicon halide or organosilicon halide, (c) organoaluminum compound and (d) diene compound, and then aging;

The U.S. Pat. Nos. 4,906,706 and 5,064,910 have disclosed a process for the polymerization of 1,3-butadiene using a catalyst which is prepared by aging a mixture of a rare earth metal, a Lewis acid and/or a Lewis base and an organoaluminum compound in the presence or absence of diene compounds. Also, the improvement of the physical properties of the resulting polybutadiene has been achieved by treating it with a modifying compound selected from the group consisting of an isocyanate, a carbon disulfide, an epoxy compound and an organotin halide compound;

The U.S. Pat. No. 4,699,962 has disclosed a process for the preparation of "high cis-BR" using a catalyst comprising a neodymium hydride, a chlorine-donor compound, an electron donor ligand and an organoaluminum compound;

The European Pat. No. 127,236 has disclosed a process for the polymerization of 1,3-butadiene using a catalyst containing (a) a neodymium compound, (b) an organohalide compound, (c) an organic compound having a hydroxy group and (d) an organoaluminum compound;

The European Pat. No. 375,421 and the U.S. Pat. No. 5,017,539 have disclosed a process for the preparation of "high cis-BR" using a catalyst comprising (a) a neodymium compound, (b) an organohalide compound and (c) an organoaluminum compound;

The European Pat. No. 667,357 has disclosed a process for preparing "high cis-BR" using a catalyst which is prepared by aging a mixture of a neodymium compound, an organoaluminum compound and tris(pentafluorophenyl) boron compound in the presence or absence of diene compound.

But, the known techniques have the following problems; (a) preparing of polybutadiene with high yield and high 1,4-cis content is difficult, (b) some gellation is caused due to the heterogeneity of catalyst in non-polar solvent.

Further, solution polymerization of diene monomer using a heterogeneous catalyst system, forming suspended matter due to incomplete dissolution to non-polar solvent, comparing to solution polymerization using a homogeneous catalyst system, usually produces some gel. The resulting gel causes increasing solution viscosity of the polymer as well as inhibiting flow of reactant or product due to accumulating of the gel at the wall of the reactor or pipe line. In addition, a heterogeneous catalyst system, comparing to a homogeneous catalyst one, gives some difficulty in controlling the amount of catalyst quantitatively which is essentially needed for smooth polymerization and for easy control of the physical properties of polybutadiene.

SUMMARY OF THE INVENTION

This invention has been accomplished in order to solve the above-mentioned problems of the known techniques. This invention aims at providing a process for preparing polybutadiene with high 1,4-cis content of over 97% and high conversion of over 90% by introducing a catalyst comprising a borontrifluoride complex together with a neodymium compound and an organoaluminum compound.

Another object of this invention is to provide a homogeneous catalyst soluble in non-polar solvents to give polybutadiene having a low gel content, thereby decreasing the solution viscosity and to facilitate a quantitative measurement of catalyst.

According to this invention, there is provided a process for producing polybutadiene which comprises the steps of polymerizing 1,3-butadiene in a non-polar solvent using a catalyst prepared by aging a mixture of (a) a neodymium compound, (b) an organoaluminum compound and (c) a borontrifluoride complex represented by formula I or formula II in the presence or absence of a small portion of conjugated diene compound.

Formula I is represented by

wherein $R_1$ and $R_2$ which can be the same or different, and are independent substituents, respectively, which are alkyl, cycloalkyl, allyl, aryl or arylalkyl groups containing from 1 to 10 carbon atoms; and Formula II is represented by

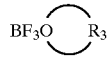

wherein $R_3$ is an alkyl group containing from 2 to 10 carbon atoms.

DETAILED DESCRIPTION OF THE INVENTION

The neodymium compound used in th is invention is preferably a carboxylate compound having a good solubility in non-polar solvents. For example, the neodymium compound includes a compound selected from the group consisting of neodymium hexanoate, neodymium heptanoate, neodymium octanoate, neodymium 2-ethyl hexanoate, neodymium naphthenate, neodymium stearate and neodymium versatate, which consists of carboxylate salts having more than 6 carbon atoms.

The borontrifluoride complex represented by the formula I or the formula II includes compound selected from the group consisting of borontrifluoride-dimethylether, borontrifluoride-diethylether, borontrifluoride-dibutylether and borontrifluoride-tetrahydrofuran.

The organoaluminum compound is conventional, which is represented by the following formula III;

Formula III is represented by:

$$AlR_4R_5R_6$$

wherein $R_4$, $R_5$ and $R_6$ which can be the same or different, and are alkyl, cycloalkyl, aryl, arylalkyl, or alkoxy groups containing from 1 to 10 carbon atoms or a hydrogen atom.

The organoaluminum compound includes a compound selected from the group consisting of trimethylaluminum, triethylaluminum, tripropylaluminum, tributylaluminum, triisobutylaluminum, trihexylaluminum, trioctylaluminum and diisobutylaluminum hydride.

A polymerization catalyst for producing polybutadiene is produced by mixing the neodymium compound, the organoaluminum compound and the borontrifluoride complex, followed by an aging process.

A solvent for aging the catalyst is a non polar solvent which is non-reactive with the catalyst, preferably cyclohexane, hexane, heptane or toluene.

Meantime, the appropriate molar ratio of the organoaluminum compound to the neodymium compound for aging the catalyst is 1:1 to 200: 1, preferably in the molar ratio of 10:1 to 150:1. If the molar ratio is less than or exceeds the above range, the conversion is decreased or polymer having low molecular weight is formed.

And the molar ratio of the borontrifluoride complex represented by the formula I or the formula II to the neodymium compound is 0.1:1 to 10:1, preferably 0.5:1 to 5:1. If the molar ratio is less than or exceeds the above range, the conversion is decreased.

The molar ratio of conjugated diene to the neodymium compound is 1:1 to 30:1, preferably 2:1 to 10:1. If the molar ratio exceeds the above range, the viscosity of catalyst solution is increased.

The procedure for preparing an aging catalyst is that a neodymium compound solution in the presence or absence of a small portion of 1,3-butadiene is placed in a catalyst reactor under nitrogen atmosphere, followed by the addition of the organoaluminum compound represented by the formula III and the borontrifluoride complex represented by the formula I or the formula II. The aging of catalyst can be made in such order of addition or in modifying order.

The appropriate aging time is in a period of 5 minutes to 10 hours, while the aging temperature is preferably at −20 to 60° C., more preferably 0 to 50° C.

The catalyst generated under the above conditions is used for the polymerization of 1,3-butadiene to obtain polybutadiene with high 1,4-cis content and high conversion. The non-polar solvent used for the polymerization of 1,3-butadiene should contain at least one or more of aliphatic hydrocarbons (e.g., butane, pentane, hexane, isopentane, heptane, octane and isooctane); cycloaliphatic hydrocarbons (e.g., cyclopentane, methylcyclopentane, cyclohexane, methylcyclohexane and ethylcyclohexane); aromatic hydrocarbons (e.g., benzene, toluene, ethylbenzene or xylene).

The polymerization solvent, which can significantly affect the polymerization, is used after removal of oxygen and water. The polymerization is initiated under high-purity nitrogen atmosphere and the polymerization temperature is preferably room temperature to 100° C. Under the appropriate catalyst conditions, two-hour polymerization is preferred with a conversion of more than 90%. The polymerization is completed by introducing polyoxyethyleneglycolether organophosphate as a reaction terminator and 2,6-di-t-butyl-p-cresol as a stabilizer. The resulting polybutadiene is precipitated with methanol or ethanol.

This invention is explained in more detail by the following examples but is not intended to be limited by these examples.

EXAMPLE 1

The Ziegler-Natta catalyst used for polymerization comprised neodymium versatate (in 1% cyclohexane solution) in the presence or absence of a small portion of 1,3-butadiene, triisobutylaluminum (in 15% hexane solution) and borontrifluoride-diethylether (in 1.5% toluene solution), while $5.7 \times 10^{-4}$ mol of neodymium versatate was employed per 100 g of monomer.

The aging of the catalyst was performed as follows: Neodymium versatate, triisobutylaluminum and borontrifluoride-diethylether in a given amount (the molar ratio of each component was 1:30:2, respectively) were successively added to an 100 ml of round-bottomed flask and aged at 20° C. for 1 hour under nitrogen.

The polymerization of 1,3-butadiene was performed using the catalyst generated from the aging process.

The polymerization process was performed as follows: Cyclohexane as a polymerization solvent, the Ziegler-Natta catalyst, aged as above, and 1,3-butadiene were added to a glass reactor which was sufficiently purged with nitrogen and reacted at 40° C. for 2 hours. The weight ratio of the polymerization solvent and 1,3-butadiene was 5:1. Then, the polymerization was completed by introducing polyoxyethyleneglycolether organophosphate as a reaction terminator and 2,6-di-t-butyl-p-cresol as a stabilizer.

EXAMPLES 2–13

Polybutadienes with high 1,4-cis contents and high conversions were prepared in the same manner as Example 1, except for using a different borontrifluoride complex, component ratio and content of each component, as shown in the following table 1.

TABLE 1

| Example | Order of addition | Molar ratio | Content of Neodymium/100 g of BD($\times 10^{-4}$ mol) |
|---|---|---|---|
| 1 | NV/Al(i-Bu)$_3$/BF$_3$OEt$_2$ | 1:30:2 | 5.7 |
| 2 | NV/Al(i-Bu)$_3$/BF$_3$OEt$_2$ | 1:30:1.5 | 5.7 |
| 3 | NV/Al(i-Bu)$_3$/BF$_3$OEt$_2$ | 1:30:1 | 5.7 |
| 4 | NV/Al(i-Bu)$_3$/BF$_3$OBt$_2$ | 1:30:2 | 4.0 |
| 5 | NV/Al(i-Bu)$_3$/BF$_3$OBt$_2$ | 1:30:2 | 3.5 |
| 6 | NV/Al(i-Bu)$_3$/BF$_3$OBt$_2$ | 1:30:2 | 3.0 |
| 7 | NV/Al(i-Bu)$_3$/BF$_3$OBt$_2$ | 1:30:1.5 | 2.8 |
| 8 | Al(i-Bu)$_3$/NV/BF$_3$OBt$_2$ | 30:1:1 | 2.8 |
| 9 | Al(i-Bu)$_3$/NV/BF$_3$OMe$_2$ | 30:1:1 | 2.8 |
| 10 | NV/BF$_3$OMe$_2$/Al(i-Bu)$_3$ | 1:1.5:30 | 2.8 |
| 11 | NV/Al(i-Bu)$_3$/BF$_3$THF | 1:30:3 | 5.7 |
| 12 | NV/Al(i-Bu)$_3$/BF$_3$THF | 1:30:1 | 2.8 |
| 13 | NV/Al(i-Bu)$_3$/BF$_3$OBu$_2$ | 1:30:1 | 2.8 |

Notes) NV: Neodymium versatate, BD: 1,3-Butadiene

COMPARATIVE EXAMPLE 1–6

Polybutadienes were prepared in the same manner as Example 1, except that instead of borontrifluoride complex, diethylaluminum chloride was used, as shown in the following table 2.

TABLE 2

| Comparative Example | Order of addition | Molar ratio | Content of Neodymium/ 100 g of BD($\times 10^{-4}$ mol) |
|---|---|---|---|
| 1 | NV/AlEt$_2$Cl/Al(i-Bu)$_3$ | 1:3:30 | 5.7 |
| 2 | NV/AlEt$_2$Cl/Al(i-Bu)$_3$ | 1:3:30 | 4.2 |
| 3 | NV/AlEt$_2$Cl/Al(i-Bu)$_3$ | 1:3:30 | 3.5 |
| 4 | NV/AlEt$_2$Cl/Al(i-Bu)$_3$ | 1:1:30 | 2.8 |
| 5 | NV/Al(i-Bu)$_3$/AlEt$_2$Cl | 1:30:3 | 4.2 |
| 6 | NV/Al(i-Bu)$_3$/AlEt$_2$Cl | 1:30:3 | 3.5 |

EXPERIMENTAL EXAMPLE 1

The 1,4-cis content and the conversion for the prepared polybutadiene in Examples 1 to 13 and Comparative Examples 1 to 4 were measured, and the results were shown in the following table 3.

The 1,4-cis content was measured by the Morero method (*Chim. Indust.*, Vol 41, p758, 1959).

TABLE 3

| | 1,4-Cis content (%) | Conversion (%) |
|---|---|---|
| Example | | |
| 1 | 97.4 | 100 |
| 2 | 97.8 | 100 |
| 3 | 97.0 | 100 |
| 4 | 97.7 | 100 |
| 5 | 98.4 | 100 |
| 6 | 98.3 | 100 |
| 7 | 97.6 | 90 |
| 8 | 98.5 | 95 |
| 9 | 98.0 | 99 |
| 10 | 97.9 | 98.3 |
| 11 | 98.5 | 100 |
| 12 | 98.1 | 96.7 |
| 13 | 98.6 | 93.3 |
| Comparative Example | | |
| 1 | 96.4 | 100 |
| 2 | 97.3 | 95 |
| 3 | 97.4 | 90 |
| 4 | 97.3 | 88 |

EXPERIMENTAL EXAMPLE 2

The Mooney and the solution viscosities were measured for the prepared polybutadiene in Examples 4 to 6 and Comparative Examples 2 to 3, and the results were shown in the following table 4.

The solution viscosity was measured at 25° C. by a Ubbelohde viscometer using a solution of 4.75 g of "high cis-BR" in 86 g of toluene. Table 4.

TABLE 4

| | Mooney viscosity (ML$_{1+4}$ 100° C.) | Solution viscosity (cps) |
|---|---|---|
| Exam. 4 | 40.4 | 259 |
| Exam. 5 | 53.2 | 445 |
| Exam. 6 | 54.2 | 461 |
| Comp. Exam. 2 | 50.2 | 620 |
| Comp. Exam. 3 | 57.4 | 1000 |

EXPERIMENTAL EXAMPLE 3

In order to compare the degree of the homogeneity of the catalyst used in Examples 4 to 6 and Comparative Examples 2, 3, 5 and 6, the number of insoluble particles was measured and the results were shown in the following table 5.

The number of insoluble particles was measured at 25° C. using the Wide Angle Laser Light Scattering System (WALLSS, Malvern Co.).

TABLE 5

| Catalyst | Number of insoluble particles (Kilocounts/sec) |
|---|---|
| Exam. 4 | 3.2 |
| Exam. 5 | 3.1 |
| Exam. 6 | 3.4 |
| Comp. Exam 2 | 345.2 |
| Comp. Exam 3 | 318.4 |
| Comp. Exam 5 | 224.8 |
| Comp. Exam. 6 | 187.9 |

As described above in more detail, this invention can provide a process for preparing polybutadiene with high 1,4-cis content over 97% and high conversion over 90% in such a manner that 1,3-butadiene is polymerized in a non-polar solvent using an aging catalyst, which has high homogeneity due to its excellent solubility in non-polar solvents resulting in producing polybutadiene having low gel content and low solution viscosity, comprising a mixture of a neodymium compound, an organoaluminum compound and a borontrifluoride complex in the presence or absence of a small portion of conjugated diene compound.

What is claimed is:

1. A process for preparing polybutadiene which comprises the step of polymerizing 1,3-butadiene in a non-polar solvent using an aging catalyst prepared by aging a mixture of a neodymium compound, an organoaluminum compound and a borontrifluoride complex represented by the formula I, or the formula II, in the presence or absence of a small portion of conjugated diene compounds where the formula I is represented by:

wherein R$_1$ and R$_2$, can be the same or different, and are independent substituents, respectively, which are alkyl, cycloalkyl, allyl, aryl or arylalkyl groups containing from 1 to 10 carbon atoms; and the formula II is represented by

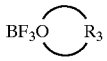

wherein R$_3$ is an alkyl group containing from 2 to 10 carbon atoms.

2. The process according to claim 1, wherein said neodymium compound is selected from the group consisting of neodymium hexanoate, neodymium heptanoate, neodymium octanoate, neodymium 2-ethyl hexanoate, neodymium naphthenate, neodymium stearate, neodymium versatate, and a mixture thereof.

3. The process according to claim 1, wherein said organoaluminum compound is selected from the group consisting of trimethylaluminum, triethylaluminum, tripropylaluminum, tributylaluminum, triisobutylaluminum, trihexylaluminum, trioctyaluminum, diiobutylaluminum hydride, and a mixture thereof.

4. The process according to claim 1, wherein said borontrifluoride complex represented by formula I or formula II is selected from the group consisting of borontrifluoride-dimethylether, borontrifluoride-diethylether, borontrifluoride-dibutylether, borontrifluoride-tetrahydrofuran, and a mixture thereof.

5. The process according to claim 1, wherein the molar ratio of said borontrifluoride complex to neodymium compound in said mixture is 0.1:1 to 10:1.

6. The process according to claim 1 wherein the aging catalyst is prepared by aging at −20 to 60° C. for 5 minutes to 10 hours.

7. The process according to claim 1, wherein the molar ratio of said conjugated diene compound to neodymium compound in said mixture is 1:1 to 30:1.

* * * * *

UNITED STATES PATENT AND TRADEMARK OFFICE
CERTIFICATE OF CORRECTION

PATENT NO. : 6,136,931
DATED : October 24, 2000
INVENTOR(S) : Young Chan Jang; Gwang Hoon Kwag; A Ju Kim; Seung Hwon Lee It is certified that error appears in the above-identified patent and that said Letters Patent is hereby corrected as shown below:

<u>Column 4,</u>
Lines 54 to 58, should be corrected as shown below:
4        $NV/Al(I-Bu)_3/BF_3OEt_2$
5        $NV/Al(i-Bu)_3/BF_3OEt_2$
6        $NV/Al(i-Bu)_3/BF_3OEt_2$
7        $NV/Al(i-Bu)_3/BF_3OEt_2$
8        $Al(i-Bu)_3/NV/BF_3OEt_2$ Signed and Sealed this Twenty-sixth Day of March, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,136,931
DATED : October 24, 2000
INVENTOR(S) : Young Chan Jang et al.

It is certified that error appears in the above-identified patent and that said Letters Patent is hereby corrected as shown below:

<u>Column 4,</u>
Line 54, "4    NV/Al(I-Bu)$_3$/BF$_3$OBt$_2$    1:30:2    4.0" should reflect as
-- 4    NV/Al/(i-Bu)$_3$/BF$_3$OBt$_2$    1:30:2    4.0 --

Signed and Sealed this

Twenty-fourth Day of August, 2004

JON W. DUDAS
*Director of the United States Patent and Trademark Office*